J. KENNEDY.
DUST CATCHER.
APPLICATION FILED MAY 26, 1909.

933,566.

Patented Sept. 7, 1909.
2 SHEETS—SHEET 1.

WITNESSES

INVENTOR

J. KENNEDY.
DUST CATCHER.
APPLICATION FILED MAY 26, 1909.

933,566.

Patented Sept. 7, 1909.
2 SHEETS—SHEET 2.

WITNESSES
R H Balderson
G L Winters

INVENTOR
Julian Kennedy,
by Bakewell, Byrnes & Parmelee,
his Attys.

UNITED STATES PATENT OFFICE.

JULIAN KENNEDY, OF PITTSBURG, PENNSYLVANIA.

DUST-CATCHER.

933,566. Specification of Letters Patent. Patented Sept. 7, 1909.

Application filed May 26, 1909. Serial No. 498,512.

*To all whom it may concern:*

Be it known that I, JULIAN KENNEDY, of Pittsburg, Allegheny county, Pennsylvania, have invented a new and useful Improvement in Dust-Catchers, of which the following is a full, clear, and exact description, reference being had to the accompanying drawings, forming part of this specification, in which—

Figure 1:
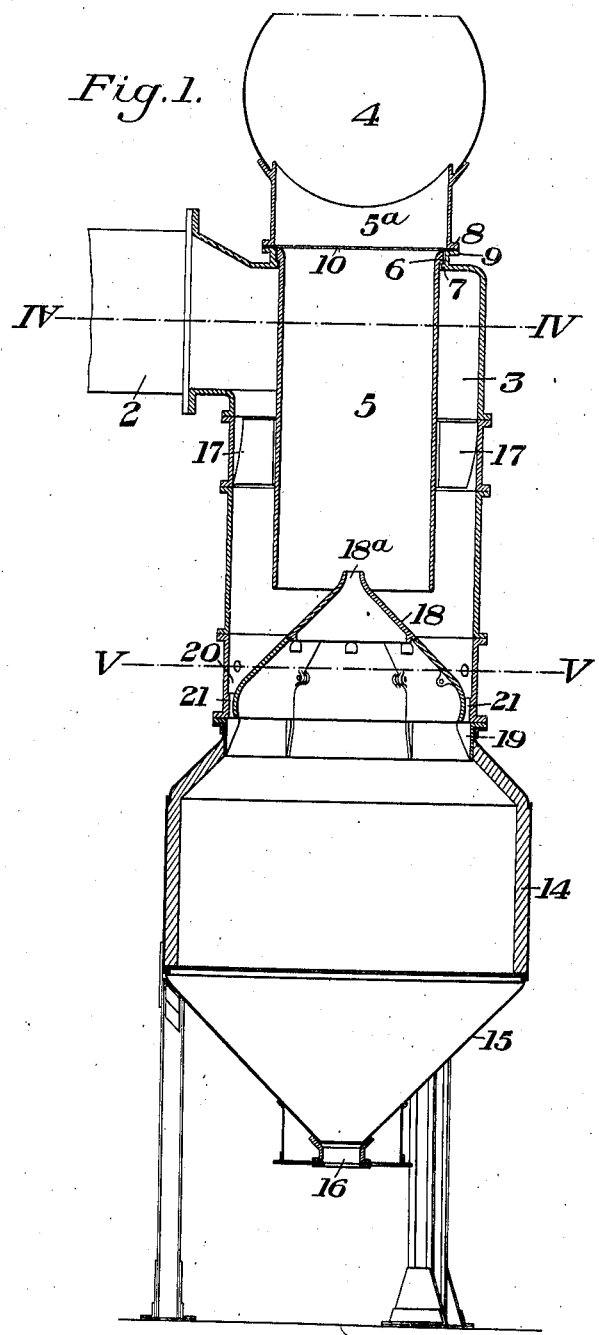
Figure 2:
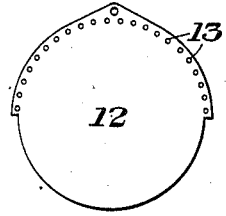
Figure 3:
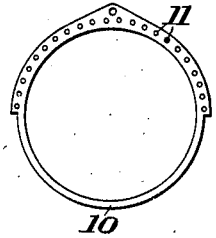
Figure 4:
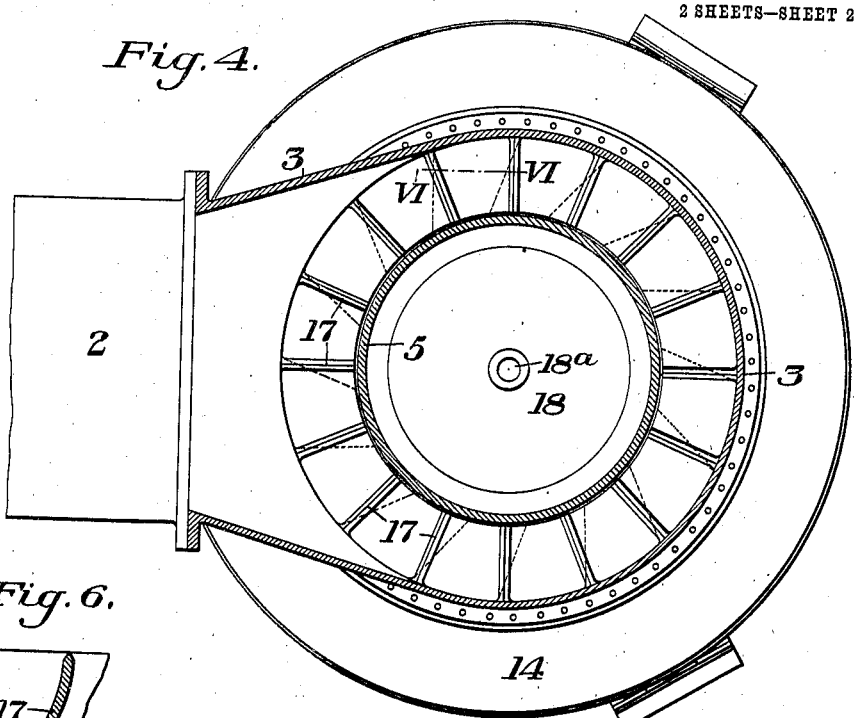
Figure 6:
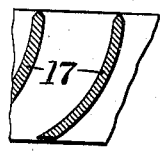
Figure 5:
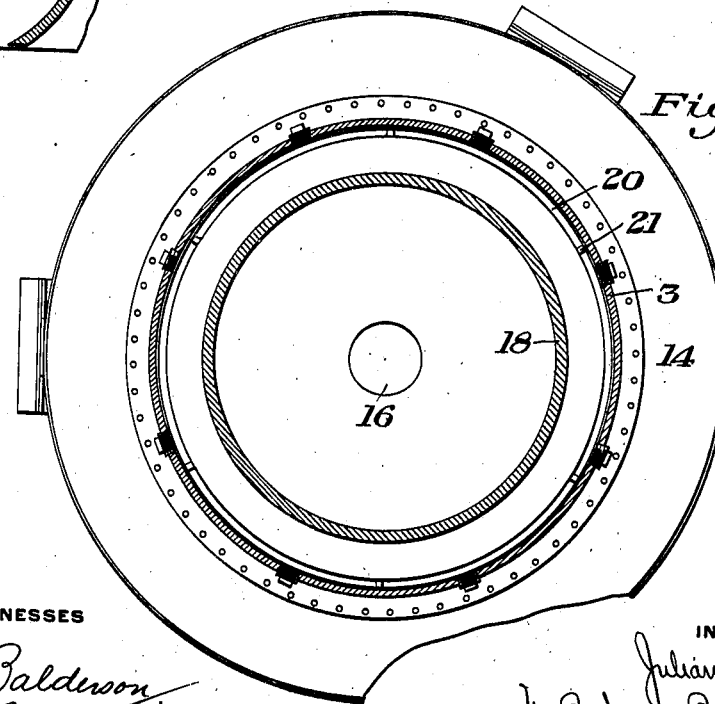

Figure 1 is a sectional elevation showing one form of dust catcher embodying my invention; Figs. 2 and 3 are detail views hereinafter more fully referred to; Fig. 4 is a section on a larger scale on the line IV—IV of Fig. 1; Fig. 5 is a section on the line V—V of Fig. 1; and Fig. 6 is a detail section on the line VI—VI of Fig. 4.

My invention has relation to dust catchers, particularly adapted for use in connection with gas mains, and is designed to provide a simple and effective catcher by means of which a maximum amount of dust may be taken from the gas.

The precise nature of my invention will be best understood by reference to the drawings, in which I have shown the preferred form thereof, and which will now be described, it being premised, however, that various changes may be made in the details of construction and arrangement of the parts without departing from the spirit and scope of my invention as defined in the appended claims.

In these drawings, the numeral 2 designates a portion of a gas main leading from the furnace, or other source of gas supply, and connected at one side with the upper portion of the chamber 3 of the dust catcher. 4 represents the gas main leading from the dust catcher, and having a down-leg 5, which extends downwardly within the dust catcher. This down-leg is preferably centrally arranged within the chamber 3, so as to leave a surrounding space for the entering gas, its lower end being open for the entrance of the outgoing gas. The lower section of this down-leg is preferably removably supported, as by means of a flange 6 at its upper end, which engages an inwardly projecting flange 7 on the wall of the chamber 3. The upper section 5ª of the down-leg, which forms the connection with the gas main 4, is shown as having a bolting flange 8 at its lower end, which is supported by a corresponding flange 9 on the upper end of the chamber 3, a ring member 10 (shown in detail in Fig. 3), being interposed between the two flanges 8 and 9. This ring member has a portion of its circumference of larger diameter than the remainder, and this enlarged segment is provided with bolt holes 11, which are designed to register with corresponding holes in the flanges 8 and 9. When it is desired to shut off the dust catcher, this ring member is removed, and the plate 12 (shown in detail in Fig. 2) is substituted in place thereof. This plate, like the ring member 10, has a portion of its circumference enlarged, and provided with a series of bolt holes 13 similar to the bolt holes 11. The purpose of providing this ring and plate with an enlarged segmental portion having bolt holes, is to enable the ring member to be removed and the plate substituted, or vice versa, by removing a portion only of the bolts connecting the flanges 8 and 9, and thus avoiding the necessity for entirely breaking the joint between the sections 5 and 5ª of the down-leg.

The chamber 3 is preferably of upright cylindrical form, and is supported at its lower end upon the upper end of a dust receiver 14. This receiver is preferably provided with a conical bottom portion 15 having a discharge opening 16 at its lower end, through which the accumulated dust may be removed at the necessary intervals.

Arranged around the down-leg 5 between the point where the gas enters the chamber 3 and the lower end of the down-leg, are a series of vanes or deflectors 17, which may be conveniently of the form shown in Fig. 6, and which are arranged to give a swirling movement to the gas in passing through the spaces between these rings. 18 is a hollow cone-shaped deflector, whose apex extends upwardly a short distance within the lower end of the down-leg 5, and which is supported upon a ring or thimble 19, seated in the upper end portion of the dust receptacle 14. The apex of the cone is provided with a relatively small opening 18ª, which is arranged to discharge within the lower portion of the down-leg. The base of this deflector is of less diameter than the interior diameter of the chamber 3, so as to leave a narrow surrounding space 20 through which the dust can pass from the lower portion of the chamber 3 into the receptacle 14. The deflector 18 is shown as centered within the lower portion of the chamber 3 by means of the spacing and centering lugs 21.

The operation will be readily understood. The gas which enters the chamber 3 from the gas main 2 passes downwardly around the down-leg 5; and in passing through the vanes or wings 17, is given a swirling movement. The gas then passes upwardly into the down-leg 5 and to the gas main 4. The swirling movement imparted to the gas in the manner described, combined with the sudden change in its direction of flow as it turns upwardly into the down-leg 5, causes a precipitation of the contained dust upon the inclined surface of the deflector 8. This dust works down this inclined surface, and passes from the space or opening 20 into the dust collector 14. The flow of the gas upwardly through the down-leg 5 creates an upward suction through the opening 18a in the apex of the cone-shaped deflector 18, which tends to constantly draw the dust downwardly through the opening 20 into the receptacle 14, thereby preventing choking or clogging of the dust at the base of the deflector. This upward suction, however, is not sufficiently strong to cause any appreciable amount of the dust to be drawn upwardly from the receptacle 14 through the relatively small opening 18a in the upper end of the deflector.

The advantages of my invention result from the simplicity of construction of the dust catcher as a whole, and from the provision of the means substantially as described, whereby the gas is given a swirling movement and is caused to change its direction, which, combined with the arrangement of the deflector, exerts a very effective separating action and causes a maximum amount of the dust carried by the gas to be precipitated upon the deflector.

It will be obvious that instead of tne vanes 17 for creating a whirling movement of the gas, any other well known means may be employed, such for instance as causing the gases to enter the upper portion of the chamber tangentially.

Many other changes may be made in the details of construction and arrangement of the parts without departing from the invention.

What I claim is:—

1. In a dust catcher, a chamber having a gas inlet connection, an off-take pipe or main having a down-leg extending into said chamber, a cone-shaped deflector below the open bottom of the down-leg, and means for causing a whirling action of the gas within said chamber; substantially as described.

2. In a dust catcher, a chamber having a gas inlet connection at its upper portion, a cone-shaped deflector within its lower portion, said deflector being of less diameter than the interior of the chamber to leave a surrounding discharge space at the base of the deflector, and an off-take pipe or main having a down-leg extending within said chamber and having its lower open end terminating over the deflector; substantially as described.

3. In a dust catcher, a chamber having a gas inlet connection at its upper portion, a cone-shaped deflector within its lower portion, said deflector being of less diameter than the interior of the chamber to leave a surrounding discharge space at the base of the deflector, and an off-take pipe or main having a down-leg extending within said chamber, and having its lower open end terminating over the deflector, said deflector having an opening at its apex within the lower portion of the down-leg; substantially as described.

4. A dust catcher, comprising a chamber having a gas inlet connection at its upper portion, an off-take pipe or main above the chamber, and having a down-leg extending downwardly within the chamber, a plurality of vanes arranged around the down-leg between the inlet connection and the lower end of the down-leg, a hollow cone-shaped deflector in the lower portion of said chamber having its apex formed with an opening and extending into the lower portion of the down-leg, a discharge opening at the base of the deflector, and a dust receptacle below the deflector and into which said opening discharges; substantially as described.

5. A dust catcher, comprising a chamber having an inlet connection, means for producing a whirling movement of the gas within said chamber, means for changing the direction of flow of the gases in said chamber, and a cone-shaped deflector at the base of the chamber and adjacent to the point where the gases change their direction of flow; substantially as described.

In testimony whereof, I have hereunto set my hand.

JULIAN KENNEDY.

Witnesses:
GEO. H. BELTZHOOVER,
C. P. BYRNES.